No. 896,093.  
PATENTED AUG. 18, 1908.  
C. ELLIS.  
STILL FOR TREATING RECOVERED GREASE.  
APPLICATION FILED MAR. 10, 1905.
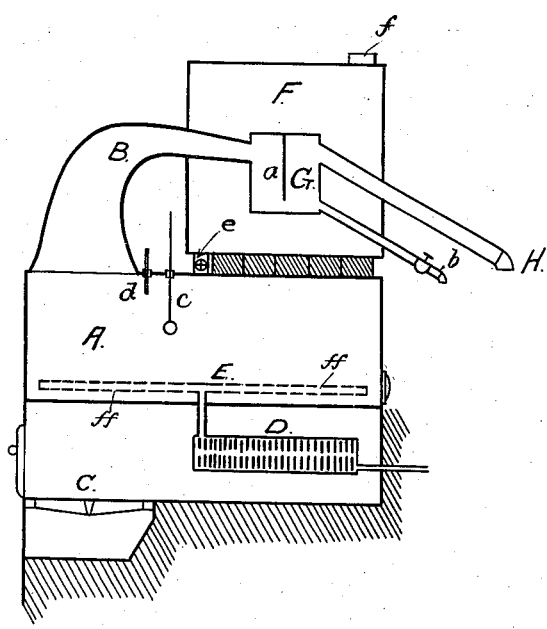

UNITED STATES PATENT OFFICE.

CARLETON ELLIS, OF BOSTON, MASSACHUSETTS, ASSIGNOR TO ELLIS-FOSTER COMPANY, A CORPORATION OF NEW JERSEY.

STILL FOR TREATING RECOVERED GREASE.

No. 896,093.     Specification of Letters Patent.     Patented Aug. 18, 1908.

Application filed March 10, 1905. Serial No. 249,435.

*To all whom it may concern:*

Be it known that I, CARLETON ELLIS, a citizen of the United States, residing at 27 Conway street, of Boston, in the county of Suffolk and State of Massachusetts, have invented certain new and useful Improvements in Stills for Treating Recovered Grease, of which the following is a specification.

In the operation of scouring wool a soapy liquid is obtained which up to the present has been but little utilized and therefore constitutes a waste product which has to be discharged into running water. As a consequence the stream is polluted and becomes a source of annoyance and danger to the dwellers along its course.

It is the object of this invention to provide an apparatus to convert these soapy liquors into valuable commercial products by recovering and purifying the contained grease and oils. The apparatus by which I accomplish this is a still, to be hereinafter described, provided with means for supplying superheated steam.

The grease is first separated by the addition to the solution of lime, or an acid, or in any other suitable manner. The mass is filtered and the filtrate, which carries no harmful ingredients may be discharged into the stream. The fatty matter is pressed to remove as much water, mechanically, as possible, and is then ready for introduction into the distilling apparatus. At this stage it contains about 20% of water and to introduce the mass directly into the still would involve heating for several hours or even a day to drive off the moisture before the distillation proper with superheated steam could be conducted. I therefore make use of the heat of condensation of a preceding distillate for drying the mass previous to introduction into the still.

The accompanying drawing shows a vertical cross-section of the still.

As shown in the drawing a cylindrical vessel "A," with goose neck "B" rests upon a fireplace "C." In the fireplace is located a superheater "D" discharging steam through a perforated pipe "E" into "A." Above the vessel "A" and connected thereto by the valved conduit $e$ is placed a second vessel "F" of somewhat less capacity than "A." The vessel F is provided with an opening $f$ for introducing the grease and permitting the escape of vapors. The goose neck "B" passes through "F" and at about the middle of its length is fitted with the trap "G" containing baffle plate "$a$." The vessel is supplied with a thermometer "$d$" and the float "$c$" for determining the level of the liquid. A distributing pipe E in the lower part of the vessel A supplies the steam required in the process of distillation. This pipe is perforated throughout its length as shown at $ff$.

The operation is as follows:—A charge of the dry grease is placed in "A," and one of the wet grease is placed in "F." "A" is then heated and the oil distilled by blowing in superheated steam. The oil is condensed in "G" and it is drawn off from time to time at H while the condensed water discharges at "$b$." The heat given out by the condensation of the steam and oils, heats the wet grease to a high temperature, driving off the contained water, thereby effectually and economically drying the oil and preparing it for distillation. By the utilization of the heat of condensation in this manner a great saving in time, fuel and cost of operation is effected.

What I claim as my invention and desire to secure by Letters Patent is:—

In an apparatus for distilling recovered grease, the combination of an elongated distilling receptacle, superimposed upon a heating chamber, a steam superheater within said heating chamber, a longitudinal perforated pipe within the distilling receptacle having connection with the superheater, a goose neck located at one end of the distilling receptacle, a trap in said goose neck provided with a vertical baffle plate, upper and lower draw-offs attached to said trap, and a preliminary drying chamber for the wet grease surrounding the said trap and resting upon the top of the other end of the distilling receptacle, a vertical valved conduit being provided for connecting the drying chamber with the distilling receptacle.

In testimony whereof I have affixed my signature, in presence of two witnesses.

CARLETON ELLIS.

Witnesses:
    HENRY C. SAWYER,
    SOPHIA WILSON.